US005485459A

United States Patent [19]
Van Steenbrugge

[11] Patent Number: 5,485,459
[45] Date of Patent: Jan. 16, 1996

[54] LOCAL COMMUNICATION SYSTEM WITH PLURAL DATA CHANNELS

[75] Inventor: Bernard Van Steenbrugge, Eindhoven, Netherlands

[73] Assignee: D2B Systems Company Limited, Redhill, England

[21] Appl. No.: 167,389

[22] Filed: Dec. 15, 1993

[30] Foreign Application Priority Data

Dec. 21, 1992 [GB] United Kingdom .................. 9226580

[51] Int. Cl.$^6$ ..................................................... H04J 3/02
[52] U.S. Cl. ........................................ 370/85.4; 370/85.13
[58] Field of Search ................................... 370/85.4, 85.1, 370/85.2, 85.3, 85.7, 95.3, 85.6, 85.5, 85.13, 94.3, 95.1; 340/825.5, 825.51; 359/108, 118, 119, 126, 135, 136; 348/148, 156, 7, 8, 9, 10, 423

[56] References Cited

U.S. PATENT DOCUMENTS 5,289,466  2/1994  Nobitoki et al. ..................... 370/85.2

OTHER PUBLICATIONS

"Audio Local Area Network Chip for Cars", Knapp et al., 92nd Convention of the Audio Engineering Society, 24-27 Mar., 1992.

"Sony-Phillips Digital Interface Format (SPDIF)", Standardised by the Ingernational Electrochemical Commission, Geneva, with Ref. IEC 958:1989.

Primary Examiner—Alpus Hsu
Assistant Examiner—Dang Ton
Attorney, Agent, or Firm—David Schreiber

[57] ABSTRACT

The system comprises a number of stations interconnected for the communication of control messages which are multiplexed with digital audio signals. The control channel is divided into eight parallel channels, and each station is allocated one channel to transmit on, while it receives from other stations on the other seven channels. Messages on each channel are segmented into finite message units. When a longer message is to be transmitted, the receiving station implement a locking mechanism such that message units will not be accepted on other channels until all message units of the message have been received. To allow the number of stations to exceed the number of data channels, some of the stations are designated "slave only", and share a single channel for the transmission of control messages. To avoid conflicts, these stations are permitted to transmit only in response to request messages from a station having its own exclusive transmit channel.

13 Claims, 6 Drawing Sheets

LOCAL COMMUNICATION SYSTEM WITH PLURAL DATA CHANNELS

BACKGROUND OF THE INVENTION

The invention relates to a local communication system comprising a plurality of stations interconnected for the communication of messages via a plurality of serial data channels. The invention further relates to apparatuses for use in such a system.

A system of this type has been described for example by Knapp and Hetzel in a paper "Audio Local Area Network Chip for Cars", presented at the 92nd Convention of the Audio Engineering Society, 24–27 March 1992, Vienna. Knapp and Hetzel propose use of the well known SPDIF format for the transmission of digital audio signals among the various components of a car audio system, and incorporate within that format eight channels for the transmission of control messages in parallel with the audio signals.

In the system of Knapp and Hetzel, known as A-LAN for short, each station (each apparatus) is constructed and configured to transmit on a respective one of the eight control channels, while receiving messages from other nodes on the remaining seven channels.

Some practical problems arise in the implementation of such a system. Firstly, the allocation of channel as described limits the number of stations connected in the ring network. The reference indicates how one might exceed this limit by providing multiple rings, with one of the stations on each ring acting as a gateway to the other ring. Such a gateway is complicated and costly to implement, however, and effectively increases the cost of adding a ninth station in an A-LAN system.

Secondly, each station may find itself obliged to receive unrelated messages simultaneously on several channels. This necessitates costly communication management provisions, for example to buffer and prioritise these messages.

It is an object of the invention to enable the provision of a local communication system as set forth in the opening paragraph, wherein the number of stations connected for the transmission of messages via the data channels is not so strictly limited by the number of data channels, while retaining the benefits of simplicity and low-cost.

SUMMARY OF THE INVENTION

The invention provides a local communication system comprising a plurality of stations interconnected for the communication of messages via a plurality of serial data channels, characterized in that the said data channels are assigned among the stations so as to define:

plural first type ("master/slave") stations, to each of which is assigned a respective own data channel for data transmission, such that each master station may transmit messages via its own data channel, while other stations may only receive data on the said channel; and a group of plural second type ("slave-only") stations, to which is assigned a shared "slaves-only" data channel for transmission, such that any slave-only station may transmit data via the common channel, wherein a slave-only station is prevented from transmitting on the shared data channel unless authorized to do so by a command received from a master/slave station having its own data channel, and wherein the master/slave stations are constructed to operate such that no more than one slave-only station is authorized to transmit via the shared channel at any given time.

In any typical system there are stations which are largely passive in the control functions of the system. In the example system cited by Knapp and Hetzel, for example, the active speaker units are unlikely to contain any control intelligence for the system as a whole. If these are identified and constructed to operate as "slave-only" stations, the invention allows one or more of the data channels to be shared, relieving the limit on the number of stations connected.

The invention may be implemented such that, at any given time only one of the master/slave stations is enabled to authorize transmission via the shared channel. In a particularly simple embodiment of this type, all but one of the master/slave stations are permanently disabled from authorizing transmission via the shared channel. Alternatively, an enabled master/slave station can transmit a predetermined token passing message to another master/slave station, in response to which the other master/slave station becomes the station enabled to authorize transmission via the shared data channel.

In common with the A-LAN system, the plural serial data channels may be logical channels multiplexed into a single serial data channel for transmission between stations, and may be further multiplexed with user information signals for the communication of audio and/or video information between stations. It should be appreciated however that the invention is by no means limited to such applications.

The invention further provides an apparatus for use in a system according to the invention as set forth above, the apparatus having the technical features of a master/slave station of the system.

The invention yet further provides an apparatus for use in a system according to the invention as set forth above, the apparatus having the technical features of a slave-only station of the system.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
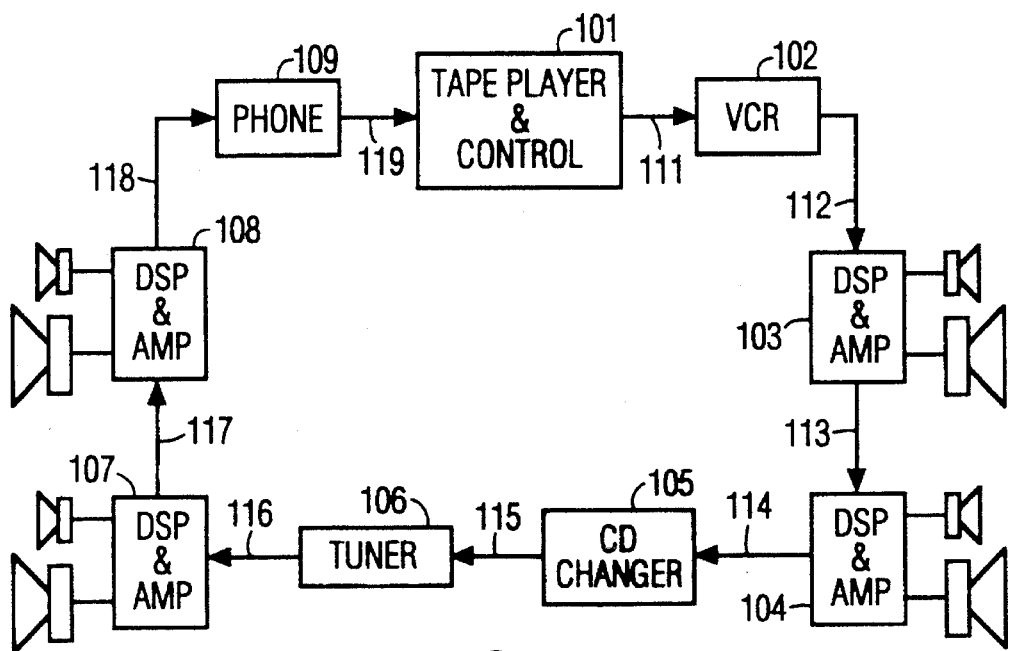
FIG. 1 shows in block schematic form a local communication system embodying the present invention.

The system illustrated in FIG. 1 comprises nine audio-related apparatuses 101 to 109 connected as stations or nodes of an Audio Local Area Network (A-LAN) of the type described in the paper by Knapp and Hetzel, cited above. In this example system, the apparatuses are: a tape player and control unit 101, a video system (VCR) 102, a Compact Disc (CD) changer unit 105, a radio tuner 106, a telephone 109 and four active speaker units 103, 104, 107 and 108. Each active speaker unit comprises digital audio signal processor (DSP), amplifier (AMP) and loudspeaker units.

The A-LAN interconnection comprises eight unidirectional point-to-point fibre optic links 111–119, such that the nodes are all connected in a ring. Each fibre link carries a combination of digital audio signals and control messages, in accordance with the so-called Sony-Philips Digital Interface Format (SPDIF), standardised by the International Electrotechnical Commission, Geneva, with reference IEC 958:1989.

Figure 2:
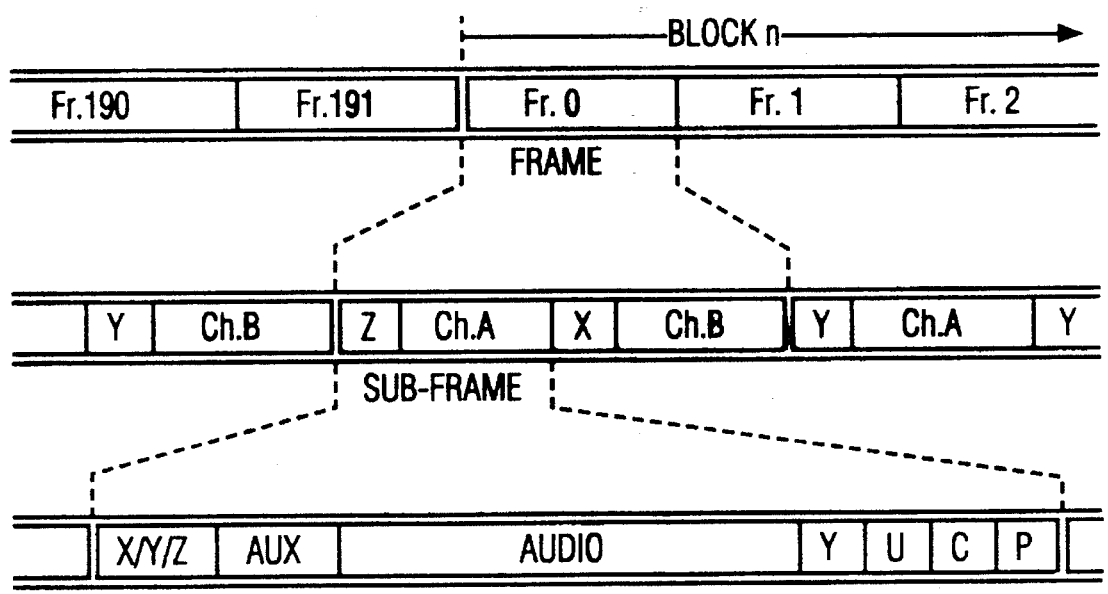
FIG. 2 shows the frame structure of digital signals transmitted between apparatuses in the system of FIG. 1.

FIG. 2 shows the structure of the SPDIF signal, which is divided into blocks of 192 frames, each frame comprising two sub-frames of 32 bits. Each sub-frame includes a 20-bit field AUDIO carrying audio signal information, and various control and information bit fields, including a preamble X, Y or Z, auxiliary data field AUX, a validity bit V, a user bit U, a channel status bit C and a parity bit P. The SPDIF specifies the meanings of all these fields, except that user bit U is left free for use by the designer of a particular system.

Figure 3:
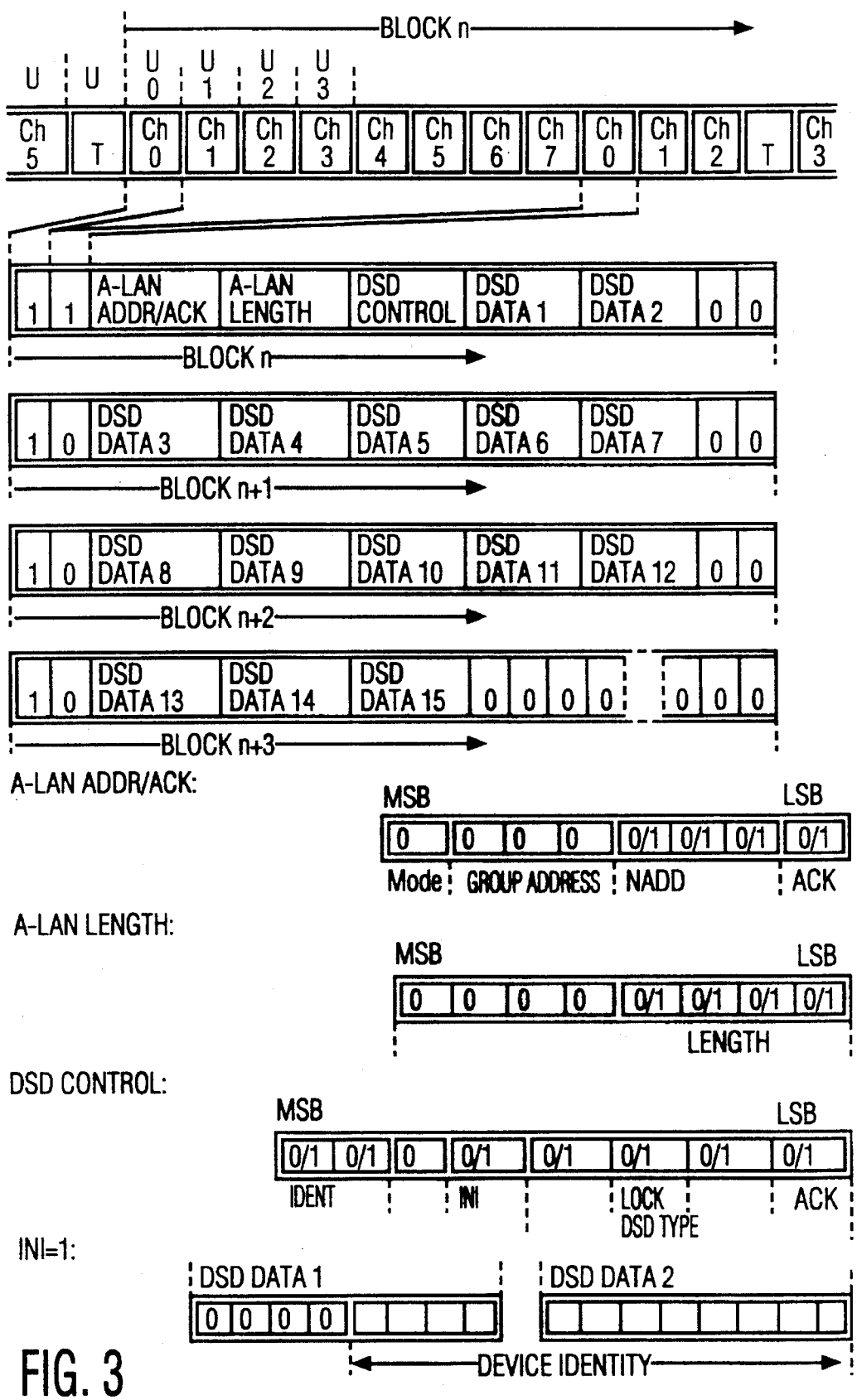
FIG. 3 shows in detail the structure of control messages in the digital signals of FIG. 2.

FIG. 3 shows the manner in which the known A-LAN system allocates user bits of successive sub-frames to convey control messages effectively on eight parallel message channels Ch0 to Ch7, plus a special "transparent channel" T. As described in the paper by Knapp and Hetzel, individual bits for message channels Ch0 to Ch7, are interleaved cyclically, while every twelfth user bit U is allocated to transparent channel T. Thus in each block of 2*192 sub-frames, 44 bits can be transmitted for each channel Ch0–Ch7, while 32 T bits are transmitted. The transparent channel (T bits) are not used for anything in the present embodiment and will not be discussed further.

As shown in FIG. 3, the A-LAN system defined by Knapp and Hetzel provides for transmission on any control channel Ch0–Ch7 of a control message carrying sixteen data bytes, occupying a period of four SPDIF blocks (Block n to Block n+in FIG. 3). At the start of each block the channel carries a SYNC bit (always a '1') followed by a START bit which is '1' only in the first of the four blocks carrying the message. Unless the context demands otherwise, the term "channel" as used hereafter should be understood as referring to an A-LAN control message channel Ch0–Ch7, and not to an SPDIF audio signal channel.

As in the Knapp and Hetzel reference, a first byte ADDR/ACK of each message carries two types of addressing information, and a space for an acknowledge bit ACK to be asserted by a receiving node. Each message can be addressed either to a particular node by means of a three-bit node address NADD, or to a group of nodes by means of a three-bit Group Address depending on the state of a Mode bit in the msb (most significant bit) position of byte ADDR/ACK. In the present embodiment, only node address NADD is used, with the mode bit remaining '0'.

In the reference, the "source address" of each message is implicit in the channel number on which it is sent. That is to say, each node is allocated its own channel for transmitting control messages, while any node can receive messages from any channel. Ignoring the transparent channel (T bits), this imposes a maximum limit of eight on the number of nodes (NADD=0 to NADD=7) that can be connected in the A-LAN loop and can transmit control messages. The system described herein adopts this convention in a modified form to allow, among other benefits, the connection of more than eight transmitting nodes to the same A-LAN loop.

A second byte LENGTH of the message specifies the number of data bytes which follow, in the range one to fifteen. The meaning of these data bytes is not specified in the Knapp and Hetzel reference. In the present system the sixteen A-LAN message data bytes are allocated to a device-subdevice control byte DSD CONTROL and fifteen device-subdevice data bytes DSD DATA 1 to DSD DATA 15. As illustrated in FIG. 3, control byte DSD CONTROL includes a two-bit field IDENT, a initiation flag bit INI, and a four bit message type field DSD TYPE. These fields are used in the present embodiment to implement device and subdevice addressing and communication protocols similar to those of the D2B system, but within the multi-channel environment of the A-LAN system.

Figure 4:
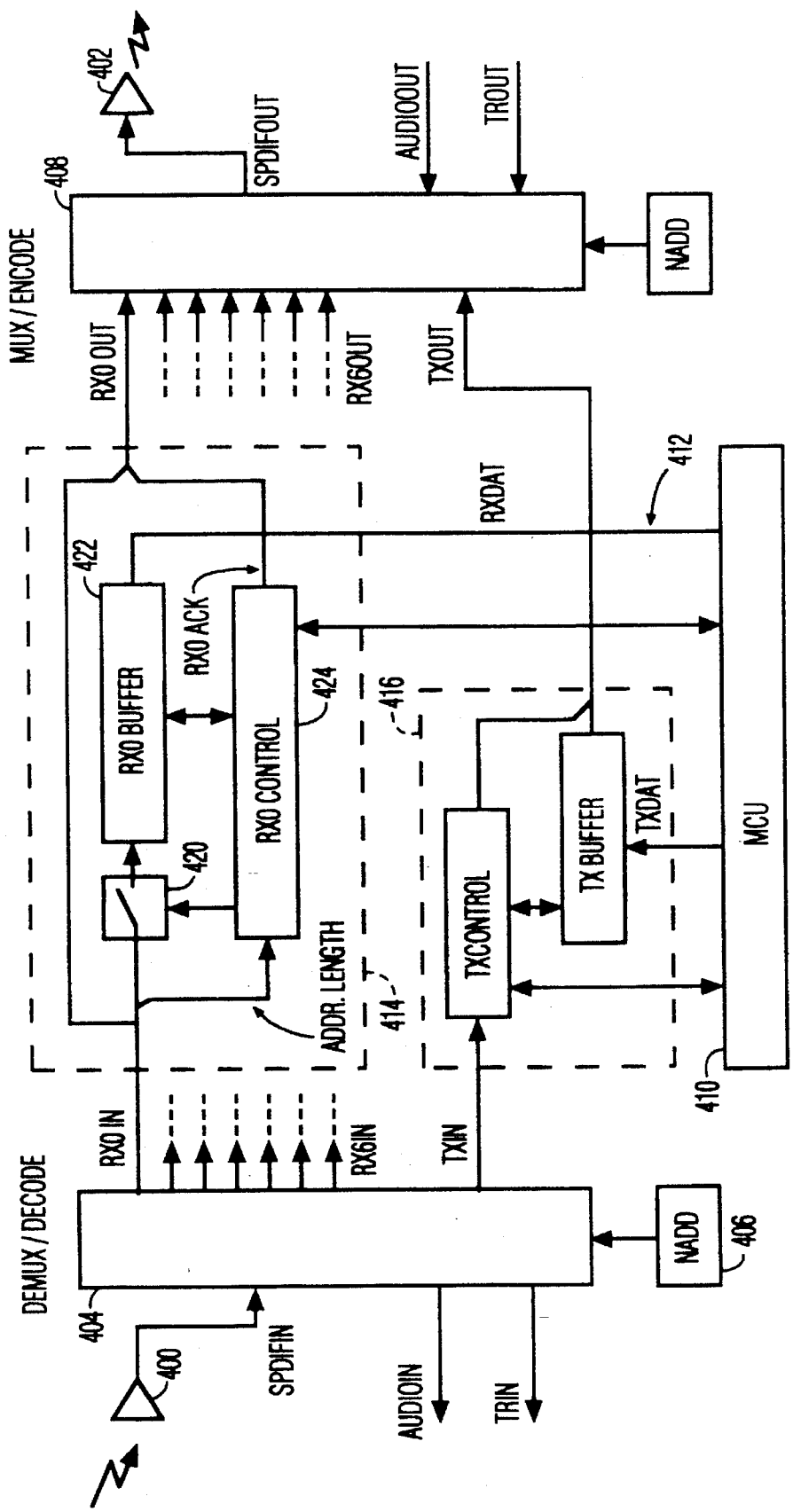
FIG. 4 shows in block schematic form an interface circuit for use in each apparatus of the system of FIG. 1.

Before describing these features and the operation of the system, it will be helpful to consider the interface circuitry that implements the connection of each apparatus to the A-LAN system. FIG. 4 provides only a schematic representation of a typical interface, and other arrangements are of course possible.

In FIG. 4 the interface circuit has an optical receiver 400 for receiving an SPDIF input signal SPDIFIN from the preceding node via the optical fibre link (111–119 in FIG. 1 ). Similarly, an optical transmitter 402 receives SPDIF output signal SPDIFOUT and transmits it via another fibre to the next node in the loop. A de-multiplexer/decoder 404 decodes signal SPDIFIN to separate the user bits U from the standard SPDIF audio and control data AUDIOIN. The data AUDIOIN passes to appropriate audio processing circuits (not shown), while the user bits are further decoded to extract data on the eight control channels Ch0–Ch7 and the transparent channel.

As described above, the apparatus has a node address NADD, and this is stored within the interface circuit at 406 and applied to the decoder 404. This allows the decoder to distinguish between seven receive-only channels RX0–RX6, whose data appears on decoder outputs RX0IN to RX6IN, and a transmit channel for this node, whose data, having passed completely around the A-LAN ring, appears at decoder output TXIN. For a node with NADD=4, for example, the transmit channel will be A-LAN channel Ch4, while receive channels RX0–RX6 will correspond to A-LAN channels Ch0–Ch3 and Ch5–Ch7. The transparent channel data contained in signal SPDIFIN appears at decoder output TRIN.

A multiplexer/encoder 408 receives data AUDIOOUT, RX0OUT to RX6OUT, TXOUT and TROUT and combines these to generate signal SPDIFOUT which is transmitted via optical transmitter 402. This data will for the most part merely echo the corresponding data decoded from signal RECEIVING, but the interface circuit allows the SPDIF signal to be modified with the additional audio and control information which this particular apparatus may generate. Audio signals are not the concern of the present description.

The control intelligence of the apparatus is represented in a programmed microcontroller (MCU) 410, which communicates via data lines 412 with the interface circuit to effect the reception and transmission of control messages via the eight message channels Ch0–Ch7. For each of the seven receive channels, the interface circuit includes a receive buffering and control arrangement, just one of which, namely that for channel RX0, is shown for illustration at 414. For the transmit channel, a transmit buffering and control arrangement 416 is provided.

The receive buffering and control arrangement 414 comprises a switch circuit 420, a 16-byte receive buffer 422 and a receive control circuit 424. In operation, receive control circuit 424 monitors the decoder output RXOIN for any message frames for which the address field ADDR (see FIG. 3) corresponds to node address NADD for the present apparatus. When such a frame is detected, control circuit 424 controls switch circuit 420 to allow the complete frame of up to sixteen message bytes to be loaded into read buffer 422. All received bits for channel RXO also pass through arrangement 414 to the corresponding input of encoder 408, for retransmission. The receive control circuit 424 is able to modify only the acknowledge bit ACK of a frame, to convey to the apparatus transmitting the frame whether the frame was received.

The contents RXDAT of the received message bytes (DSD CONTROL and DSD DATA 1-15 in the present embodiment) can be read by the MCU 410 from receive buffer 422. As described in the reference, control circuit 424 and switch can be configured to prevent the message bytes being overwritten by a new frame until they have been read by MCU 410. As described in the reference, however, this does not prevent new message frames with the appropriate address being received into the receive buffers of the other channels RX1–RX5.

The transmit buffering and control arrangement 416 comprises a transmit buffer 428 and transmit control circuit 430. MCU 410 prepares a message frame to be transmitted and loads it into buffer 426, whereupon the transmit control circuit 430 causes the bit fields of the frame to be supplied at TXOUT to the multiplexer/encoder 408, for inclusion in the appropriate control channel within signal SPDIFOUT. Once this signal has passed around the A-LAN ring, it is received and decoded again at TXIN. The received frame TXIN is simply a delayed version of the transmitted frame, but with its acknowledge bit ACK modified according to whether or not it was accepted by the addressed node. If the frame was not accepted, MCU 410 and control circuit 430 are at least aware of the fact, and may caused the frame to be re-transmitted until it is accepted.

So far as has been described, the interface operates substantially as described in the reference. The present embodiment has modified behavior, however, in two significant respects. Firstly, a locking mechanism is implemented, so that the MCU 410 of each apparatus does not require the complex software protocols necessary to handle up to seven messages being received simultaneously on the channels RX0–RX6. At the same time, each node can be addressed as a 'device', with functional elements being addressable within each device as 'subdevices', in a similar manner to the D2B system standardized in IEC 1030.

Figure 5:
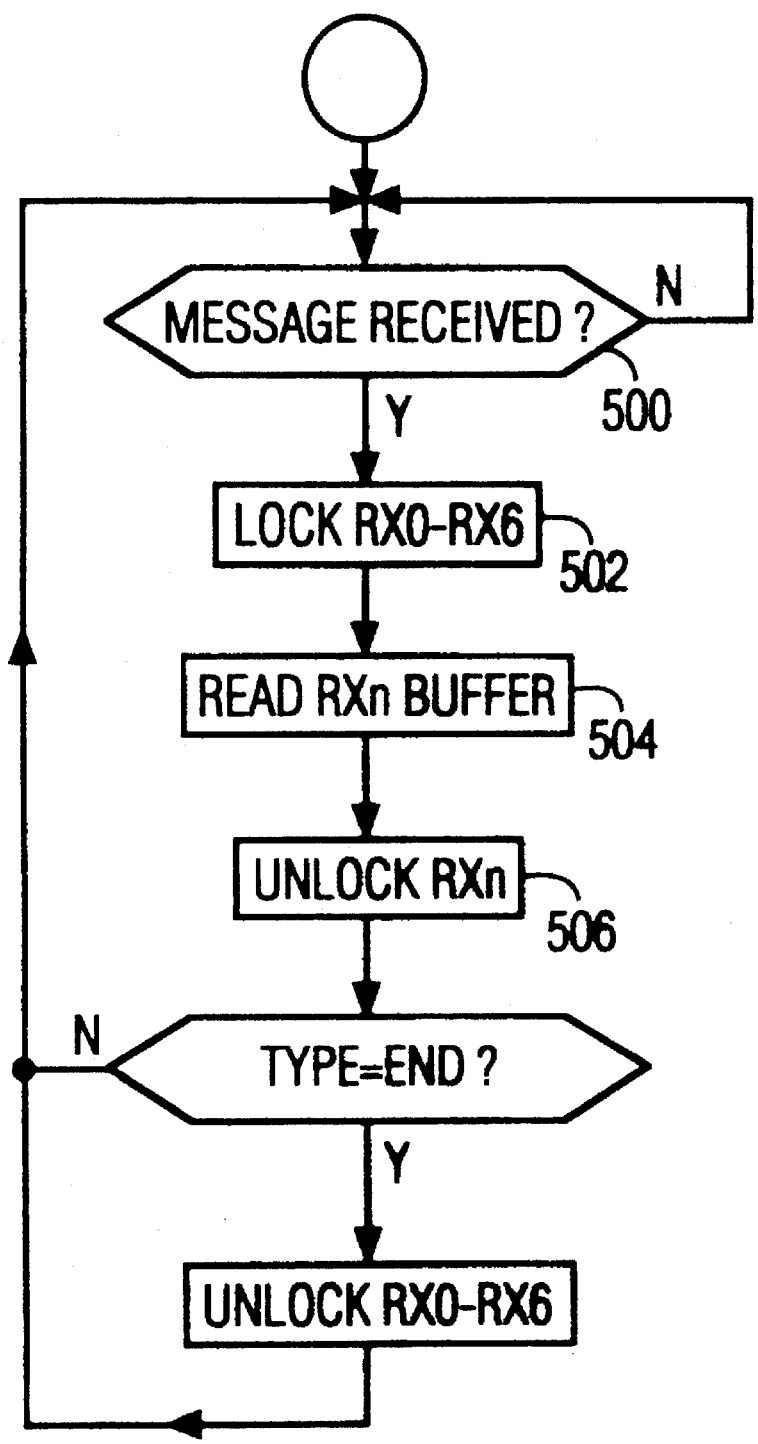
FIG. 5 is a flow chart illustrating the operation of a locking mechanism in the system of FIG. 1.

FIG. 5 illustrates the method by which MCU 410 cooperates with the receive buffering and control arrangements for the seven receive channels RX0–RX6 to implement this locking mechanism. The mechanism uses the field DSD TYPE in the first byte DSD CONTROL of each sixteen-byte message frame (see FIG. 3). The field IDENT of DSD CONTROL merely carries a value which increments (modulo-4) from one frame to the next. The field INI is '1' only for a special initiation message, transmitted by every node at power-on. As indicated in FIG. 3, the first two DSD DATA bytes of the initiation message can carry a twelve-bit device identity, analogous to the device address of the D2B system. This address is not only unique to the individual apparatus, but also indicates the apparatus type: disc player, radio tuner etc.

TABLE I

| DSD Message Types | | |
|---|---|---|
| DSD TYPE | Message Type | Lock/Unlock |
| 1010 | Command Message | Lock |
| 1011 | Data Message | Lock |
| 1000 | Request Message | Lock |
| 0011 | Answer Message | Lock |
| 1110 | End Message | Unlock |

The four bits of DSD TYPE specify which one of five different message frame types is being transmitted, as shown in Table I. These five types divide into 'locking' and 'unlocking' message types. The further subdivisions are as follows.

DSD TYPE 1010 indicates a 'command' type of message (locking), which comprises an operation code (op-code) and optionally operand codes for controlling operation of the receiving apparatus. Since a large number of operands may not fit within the finite message size (DSD DATA 1–15), a 'data' type of message with DSD TYPE 1011 (also locking) is provided for carrying further operands.

DSD TYPE 1000 indicates a 'request' type of message (locking), which again comprises an opoCode and operands for specifying required information required from another apparatus. DSD TYPE 0111 indicates a message comprising an answer to such a request, and is also a locking message. DSD TYPE 1110 indicates an end of communication between two devices, and is an unlocking type.

Referring to FIG. 5, the steps 500 etc. of the method implemented in the interface of FIG. 4 are as follows:

500: The receive control circuit 424 of every receive channel RX0–RX6 monitors that channel until a message is received which is addressed to the present node (Node i.d. equals NADD).

502: Immediately a message is received on a channel RXn, the overwrite protection mechanism (switch 420) is activated to lock the buffers 422 for all channels RX0–RX6.

504: MCU 410 reads the received message from the receive buffer for channel RXn, and begins processing the data bytes DSD DATA 1–15 as appropriate.

506: After the message has been read, the buffer 422 for channel RXn is unlocked for reception of a further message frame (if any) from the same node (remembering that all messages on channel RXn come from the same node).

508: If the message was a locking message, control returns to step 500 with only the buffer for channel RXn unlocked. Messages on the other channels will not be accepted by the interface circuit.

510: If the message was an unlocking message, the receive buffers 422 of all receive channels RX0–RX6 are unlocked, and control returns to step 500 with the interface ready to accept messages on all channels.

Table II below shows the allocation of A-LAN channels Ch0–Ch7 to the various apparatuses of the system of FIG. 1. Each apparatus has its own transmission channel, except the Active Speaker units which share the same channel Ch7 for transmission, in a manner to be described.

TABLE II

Channel Allocation

| Apparatus | Ref. | NADD | TX Channel |
| --- | --- | --- | --- |
| Tape Player and Control | 101 | 1 | Ch1 |
| VCR | 102 | 2 | Ch2 |
| Active Speaker | 103 | 7 | Ch7 |
| Active Speaker | 104 | 7 | Ch7 |
| CD Changer | 105 | 3 | Ch3 |
| Tuner | 106 | 4 | Ch4 |
| Active Speaker | 107 | 7 | Ch7 |
| Active Speaker | 108 | 7 | Ch7 |
| Phone | 109 | 5 | Ch5 |

Figure 6:
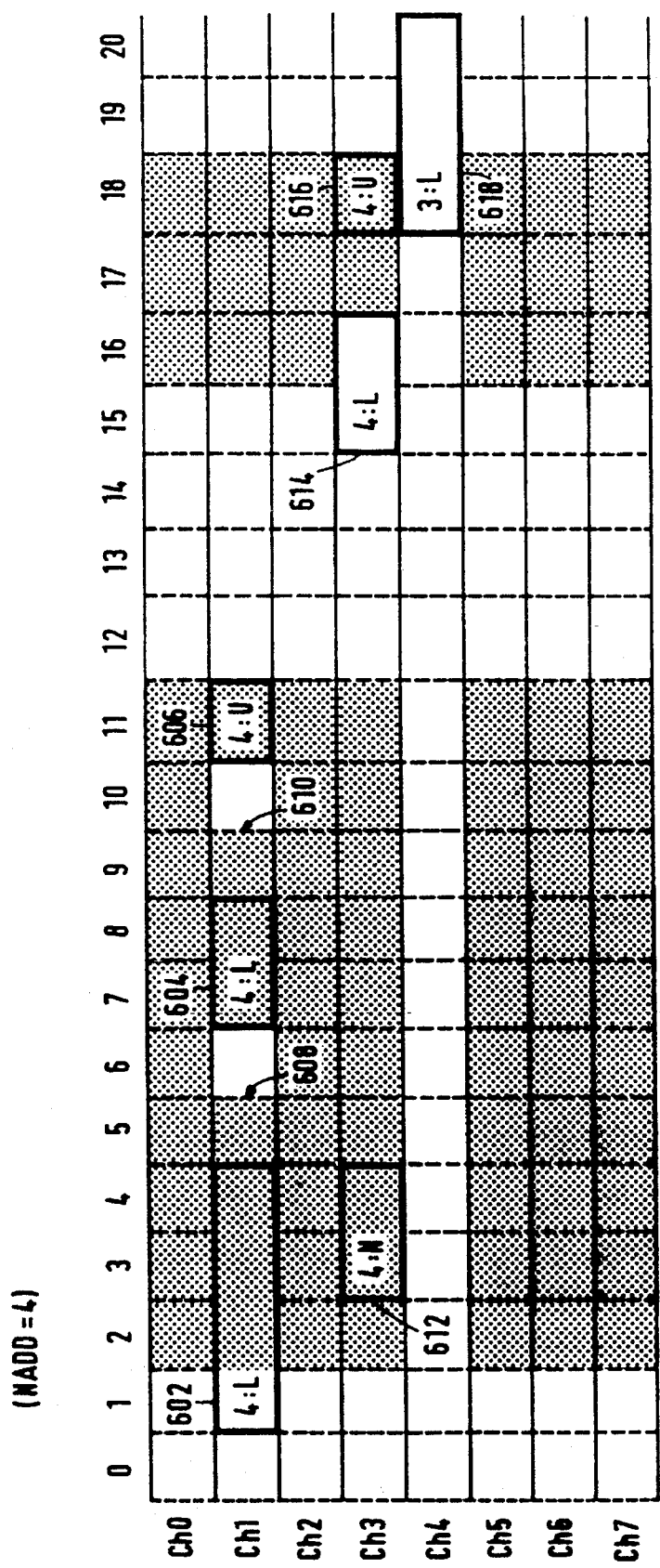
FIG. 6 illustrates the transmission of messages in the system, and the operation of the locking mechanism.

FIG. 6 illustrates the operation of the locking mechanism over the system as a whole, the channels Ch0–Ch7 being represented as 5eight parallel rows of message frames with time increasing from left to right. All messages are aligned to the SPDIF block boundaries which are marked with broken lines vertically in the figure. The SPDIF blocks are numbered 0–20 along the top of the figure for reference only. The figure is drawn from the viewpoint of the tuner 106 whose transmit channel is Ch4 (NADD=4). Shaded areas in the figure indicate times at which the tuner's receive buffer is locked for each particular channel. There is no shading for Ch4 because this is the tuner's transmit channel.

Various messages occupying one to four blocks are represented by thick boxes in the appropriate channel. The destination (node i.d.) to which each message is addressed is shown within the box, together with the letter 'L' or 'U', depending on whether a message is of locking or unlocking type respectively. The letter 'N' indicates that the message is not accepted by the relevant receive buffer of the destination node.

The first message transmitted is a locking type message 602 (Ch1, blocks 1–4) sent by the tape player and control unit 101 (NADD=1) and addressed to the tuner (NADD=4). This is for example a Command type message, and is followed by a supplementary Data type message 604 (Ch1, blocks 7,8) and an End type (unlocking) message 606. These latter two messages occupy fewer than four block periods each because the number of DSD DATA bytes carried (A-LAN LENGTH) is fewer than the maximum of 15. In response to the first message 602, the tuner (NADD=4) locks all of its receive buffers (see shading) until receipt of the unlocking message in block 11. Upon receipt, each of the messages is read from the Ch1 readd buffer, which alone is then unlocked (see 608, 610). After the unlocking message is read from the buffer, all channels are unlocked (see block period 12).

During the block periods 2–11 when the read buffers of the tuner are locked, CD changer unit 105 (NADD=3) tries to send a Request type message 612 via channel Ch3 addressed to the tuner (NADD=4), but this is not accepted ('4:N') by the tuner. CD changer unit 105 (NADD=3) tries again to send the Request message at 614. This is successful, causing the receive buffers of the tuner to become locked again until receipt of an unlocking message 616 from the same node (Ch3, block 18). Tuner 106 reads the request message 614 from its receive buffer and sends an Answer message 618 to CD changer unit 105 (NADD=3).

It will be appreciated that the locking mechanism does not prevent the parallel transmission of different messages on all eight channels in a single frame, provided these are addressed to different destination nodes. Nevertheless, the operating method of FIGS. 5 and 6 may appear at first sight to degrade the theoretical performance of the A-LAN system, in that an interface capable of receiving on eight channels simultaneously can now only receive on one channel at a time. Those skilled in the art will appreciate, however, that to realize that theoretical performance level, a great deal of communication management processing and storage would have to be provided by the microcontroller. In contrast, the mass-market applications for which A-LAN was apparently conceived dictate that the overhead cost for control message communication must be very small, while very high message throughput on parallel channels is scarcely required. The present embodiment, in which the interface will not accept messages arriving from different sources at the same time, is relatively inexpensive in terms of microcontroller performance and storage requirements, making it suitable for applications where small physical size and low cost are the main concern. In any event, the designer of an apparatus in which processing power and storage are not so limited is free to arrange that the node in question will not lock all receive channels upon receipt of a message.

The second significant difference between the present system and that described in the reference is that a group of apparatuses are designated as 'slave only' nodes, not having their own transmit channels, while one of the eight message channels, Ch7, is allocated as a 'slaves only' channel, upon which these nodes may transmit one at a time. It is important to appreciate that the terms 'master' and 'slave' are used herein in the context only of the control message channels Ch0–Ch7, and do not correspond to the similar term used by Knapp and Hetzel in the context of the A-LAN audio system as a whole. In the in-car entertainment system of FIG. 1, the active speaker units 102, 103, 107 and 108 are designated 'slave only', and assigned to transmit on Ch7, as shown in Table II above.

The A-LAN system as described in the reference does not provide for arbitration on any of the channels, with the result that errors will occur in the case of a collision, that is if two nodes try to transmit on one of the channels Ch0–Ch7 at the same time. In general, the active speaker units (for example) carry little or no control intelligence for the system, and therefore the only messages they will need to transmit are answers to requests for status information from the other, more intelligent devices. By making it a rule that no node may transmit on Ch7 except in response to a request from a node on a different channel, the responsibility for avoiding collisions between slave only devices is placed in the hands of the more 'intelligent' master devices.

In the fixed-configuration in-car audio system of FIG. 1, a very simple mechanism is implemented to regulate use of Ch7: only the tape player and control unit 101 is constructed to request information from the active speaker units (slave only devices), so that the required permission is permanently given to that node (NADD=1). In such an embodiment, the 'cooperation' referred to in the introduction is implicit in the functionality construction of the master/slave stations.

Figure 7:
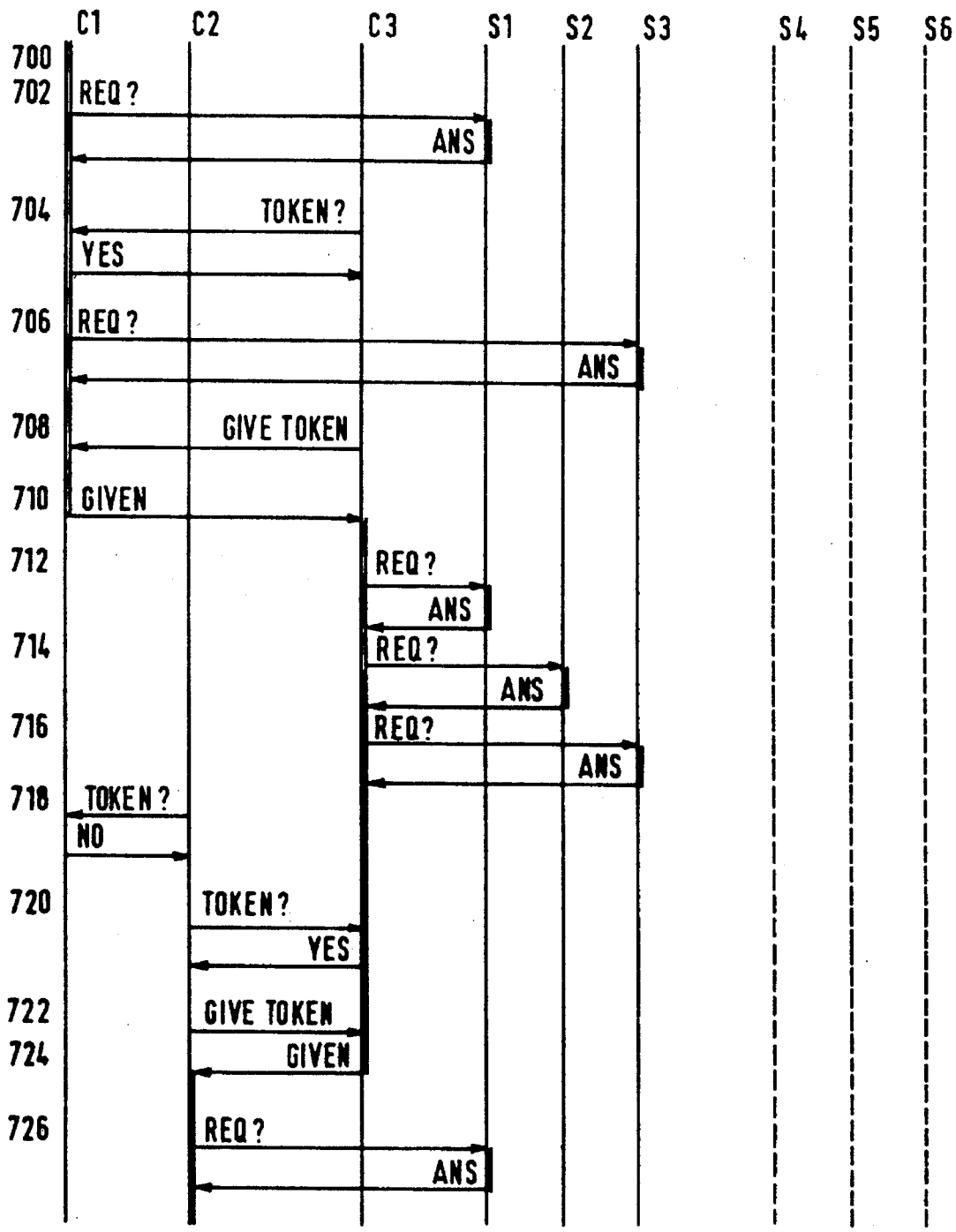
FIG. 7 illustrates the operation of a token passing mechanism in an alternative embodiment of the invention.

FIG. 7 illustrates operation of an alternative embodiment, in which more than one master/slave node can request information from slave only nodes on a shared channel. To implement this mechanism, a more explicit form of cooperation is required, and a set of command and request messages are defined and recognized by each node as follows.

A request message [TOKEN?] is defined, with possible answers: [YES], meaning 'I currently have permission'; [NO] ('I do not currently have permission'); and [NOT IMPLEMENTED] ('I am not constructed to play any part in the token passing mechanism'). Two commands [GIVE TOKEN] and [GIVEN] are also defined. These messages are used by the master/slave nodes to implement a so-called "token passing" mechanism, whereby permission to request information from the slave only nodes is passed between the master nodes such that only one at a time has that permission. The operation of this mechanism will now be described with reference to the example message sequence shown in FIG. 7.

In FIG. 7, three nodes C1, C2 and C3 are designated master/slave, while three other nodes S1, S2 and S3 are designated slave only. Each node is represented by a vertical time line, with time increasing from the top to the bottom. When a master/slave node has permission to authorise transmission on the shared channel, the corresponding time line is shown doubled in FIG. 7. Similarly, when a slave only node is authorized to transmit a message on the shared channel, this is shown by a double time line.

The example sequence begins at 700, at which time node C1 alone has the permission to authorize transmission on the shared channel, and proceeds as follows:

702: Having permission to do so, node C1 addresses a request message to node S1, and receives an answer from S1 via the shared channel. In the example of the A-LAN message format (FIG. 3), all nodes S1–S3 will receive the request message, but the content of the message (DSD DATA) will specify which node (S1, S2 or S3) is to respond, for example by means of unique address codes, pre-defined in addition to the A-LAN node address NADD.

704: Node C3 wishes to receive information via the shared channel, and addresses a request message [TOKEN?] to node C1. The answer [YES] shows that C1 currently holds the permission.

706: Still having permission, C1 addresses a request for information to node S3, and receives and answer via the shared channel.

708: Node C3 requests permission to be transferred from C1 by means of a [GIVE TOKEN] command.

710: Node C1 addresses a [GIVEN] command to C3, at which time C3 gains the permission and C1 loses it.

712, 714, 716: Node C3 requests and receives information from each node S1, S2, S3 in turn.

718, 720: Now node C2 wishes to receive information from a slave only node, and discovers by means of two [TOKEN?] requests that C3 currently has the required permission.

722: Node C2 asks C3 for a transfer of permission using the command [GIVE TOKEN].

724: C3 responds by a message [GIVEN], at which point C2 becomes the only master/slave node authorized to request information via the shared channel.

726 etc.: Node C2 continues to request and receive messages via the shared channel.

FIG. 7 also shows three further nodes S4 to S6. The person skilled in the art will readily appreciate how to adapt the above embodiments according to the number of nodes and the communication requirements of each. Accordingly, the further nodes may be master/slave or slave only, and may or may not share the same transmission channel and token passing mechanism as already described. In particular, however, it may be noted that a number of distinct channels may be shared for transmission by respective groups of slave only channels, for example so that nodes S4 to S6 share a different channel to that shared by nodes S1 to S3. In such a case, the mechanism for avoiding collisions can be different on each shared channel, provided that only one node is authorized to transmit on each channel at a given time.

As mentioned in the introduction above, the invention is not limited to A-LAN or SPDIF-compatible systems. It may find application in other communication systems having plural data channels, whether carried optically, electrically or by wireless, and whether or not the channels are multiplexed with each other or with other information.

From reading the present disclosure, other variations will be apparent to persons skilled in the art. Such modifications may involve other features which are already known in the design, manufacture and use of local communication systems, electronic apparatuses and component parts thereof, and which may be used instead of or in addiction to features specifically described herein. Although claims have been formulated in this application to particular combinations of features, it should be understood that the scope of the disclosure of the present application also includes any novel feature or novel combination of features disclosed herein either explicitly or implicitly, and whether or not it relates to the same invention as presently claimed in any claim, and whether or not it mitigates any or all of the same technical problems as does the present invention. The applicants hereby give notice that new claims may be formulated to such features during the prosecution of the present application or of any further application derived therefrom.

I claim:

1. A local communication system for communicating messages via a plurality of serial data channels, comprising:

a first group of stations, to each of which is assigned a respective one of said serial data channels for data transmission; and a second group of stations, to which is assigned a shared serial data channel for transmission, such that said second group of stations transmits data via the shared serial data channel;

each station in said second group of stations being prevented from transmitting on said shared serial data channel unless authorized to transmit by a command received from one of said stations in said first group of stations having its own data channel, and wherein only one of said second group of stations being so authorized to transmit via said shared serial data channel at any given time.

2. A system as claimed in claim 1, wherein only one station of first group of stations is enabled to authorize transmission via said shared serial data channel during a predetermined time period.

3. A system as claimed in claim 2, wherein only one station of the first group of stations is enabled to authorize transmission via said shared serial data channel.

4. A system as claimed in claim 2, wherein an enabled station of said first group of stations can transmit a predetermined token passing message to another station of said first group of stations, in response to which the other station becomes enabled to authorize transmission via said shared serial data channel.

5. A system as claimed in claim 1, wherein said serial data channels are logical channels which are time multiplexed into a single data channel.

6. A system as claimed in claim 1 wherein said single data channel is further multiplexed with user information signals for communication of at least one of audio and video information.

7. A system as claimed in claim 1, wherein the stations are interconnected by unidirectional fiber-optic links.

8. A system as claimed in claim 2, wherein said serial data channels are logical channels which are time multiplexed into a single data channel.

9. A system as claimed in claim 3, wherein said serial data channels are logical channels which are time multiplexed into a single data channel.

10. A system as claimed in claim 2 wherein said single data channel is further multiplexed with user information signals for communication of at least one of audio and video information.

11. A system as claimed in claim 3 wherein said single data channel is further multiplexed with user information signals for communication of at least one of audio and video information.

12. A system as claimed in claim 2, wherein the stations are interconnected by unidirectional fiber-optic links.

13. A system as claimed in claim 3, wherein the stations are interconnected by unidirectional fiber-optic links.

* * * * *